United States Patent
Davis et al.

(10) Patent No.: US 11,040,422 B1
(45) Date of Patent: Jun. 22, 2021

(54) MANUAL STAGE WITH MAGNETIC SENSOR AND DIGITAL READOUT

(71) Applicants: Dennis Willard Davis, Palm Bay, FL (US); James Wallin, Terra Ceia, FL (US)

(72) Inventors: Dennis Willard Davis, Palm Bay, FL (US); James Wallin, Terra Ceia, FL (US)

( * ) Notice: Subject to any disclaimer, the term of this patent is extended or adjusted under 35 U.S.C. 154(b) by 269 days.

(21) Appl. No.: 16/350,853

(22) Filed: Jan. 24, 2019

Related U.S. Application Data

(60) Provisional application No. 62/709,654, filed on Jan. 25, 2018.

(51) Int. Cl.
*B23Q 1/26* (2006.01)
*G01B 7/30* (2006.01)
*G01D 5/14* (2006.01)
*B23Q 1/44* (2006.01)
*G01B 5/00* (2006.01)
*B23Q 1/00* (2006.01)
*G01D 11/24* (2006.01)

(52) U.S. Cl.
CPC ........... *B23Q 1/262* (2013.01); *B23Q 1/0054* (2013.01); *B23Q 1/44* (2013.01); *G01B 5/0002* (2013.01); *G01B 7/30* (2013.01); *G01D 5/145* (2013.01); *G01D 11/245* (2013.01)

(58) Field of Classification Search
CPC ........ B23Q 1/262; B23Q 1/0054; B23Q 1/44; G01B 7/30; G01B 5/0002; G01D 5/145; G01D 11/245
See application file for complete search history.

(56) References Cited

U.S. PATENT DOCUMENTS

| | | | | |
|---|---|---|---|---|
| 1,507,272 A | * | 9/1924 | Buckingham | G01B 5/08 33/501.4 |
| 1,525,491 A | * | 2/1925 | Bath | G01B 3/18 33/567.1 |
| 2,642,671 A | * | 6/1953 | Graham | B25D 5/02 33/501.4 |
| 3,247,598 A | * | 4/1966 | Wilkes | G01B 3/306 33/567.1 |
| 3,803,518 A | * | 4/1974 | Perthen | G01B 5/12 33/544.1 |
| 4,251,922 A | * | 2/1981 | Perlotto | B23Q 17/2225 33/1 M |

(Continued)

*Primary Examiner* — Nimeshkumar D Patel
*Assistant Examiner* — Tania Courson

(57) ABSTRACT

The disclosed device comprises a manually-actuated micro positioning stage that incorporates a mechanism for measurement and electronic output of the stage slider position. A Hall Effect sensor device is used to sense rotary position of the lead screw. based on the lead screw pitch. Processor means converts the Hall Effect sensor measurement of the lead screw rotational displacement into linear displacement of the stage slider for presentation on an electronic display. A magnetically-permeable cap contains a small disc magnet that is poled diametrically and is affixed to the end of the lead screw that is in contact with the stage slider by means of a sensor housing. The Hall Effect sensor contained in a surface mount electronic package is enclosed in a sensor housing that is part of the stage slider that is in contact with the lead screw and is positioned coaxially with the lead screw.

6 Claims, 9 Drawing Sheets

Prior Art

(56) References Cited

U.S. PATENT DOCUMENTS

| | | | | |
|---|---|---|---|---|
| 4,536,963 A * | 8/1985 | Yamamoto | ............... | G01B 3/18 33/544.6 |
| 4,639,547 A * | 1/1987 | Jacob-Grinschgl | ......................... | G06F 3/03543 178/19.03 |
| 4,885,845 A * | 12/1989 | Yamamoto | ............... | G01B 3/46 33/544.5 |
| 5,172,485 A * | 12/1992 | Gerhard | ................ | G01B 3/002 33/558 |
| 5,253,431 A * | 10/1993 | Smith | ...................... | G01B 7/14 33/784 |
| 5,370,011 A * | 12/1994 | Gilges | .................... | F16H 25/20 192/143 |
| 6,247,244 B1 * | 6/2001 | Zanier | ..................... | G01B 3/18 33/784 |
| 6,308,433 B1 * | 10/2001 | Takahashi | ................ | G01B 3/18 33/819 |
| 6,781,265 B2 * | 8/2004 | Hayashida | ............... | H02K 7/06 310/80 |
| 6,915,591 B2 * | 7/2005 | Hayashida | ............... | G01B 3/18 33/815 |
| 6,983,547 B2 * | 1/2006 | Fleming | ................. | F16C 11/12 33/1 M |
| 7,071,680 B2 * | 7/2006 | Kurz | ..................... | G01D 5/485 324/207.13 |
| 7,810,251 B1 * | 10/2010 | Goeden | ................ | G01B 5/0004 33/567.1 |
| 7,856,900 B2 * | 12/2010 | Benoit | ..................... | H02K 7/06 74/89.34 |
| 7,971,487 B2 * | 7/2011 | Carlen | ................... | G01D 18/00 73/760 |
| 8,091,251 B1 * | 1/2012 | Zhang | ..................... | G01B 3/18 33/819 |
| 8,459,174 B2 * | 6/2013 | Zeichner | ............... | F16H 25/2015 92/136 |
| 2002/0129503 A1 * | 9/2002 | Botos | ...................... | B23Q 1/58 33/1 M |

* cited by examiner

MANUAL STAGE WITH MAGNETIC SENSOR AND DIGITAL READOUT

CROSS REFERENCE TO RELATED APPLICATIONS

This application claims the benefit of provisional patent application Ser. No. 62/709,654 filed 2018 Jan. 25.

BACKGROUND

Compact, manual, lead screw-driven positioning stages are available that offer micro-positioning capability based on use of axially-preloaded precision lead screws and laterally-preloaded sliders. Although such stages provide submicron adjustment sensitivities, measurement of actual slider translation must be accomplished by attached micrometers or external measurement devices. Attached micrometers are not accurate enough to measure the finest motion available from these stages. Also, both micrometers and external measurement devices consume space that detracts from the compact size of the stage, which is critical to many applications. What is needed is a stage-integrated sensor that can provide the necessary accuracy in a small volume.

SUMMARY OF THE INVENTION

Disclosed is a compact manual stage that uses a lead screw to drive an axial spring-preloaded slider which incorporates a sensor that measures rotation of the lead screw. The sensor comprises a device that measures the motion of a rotating inhomogeneous magnetic field associated with a magnet mounted on the end of the lead screw. The sensor is mounted on the moving slider and a flexible circuit electrically connects the sensor to a connector port on the non-moving stage body. The connector port permits a wired connection between the stage and display enclosure that provides sensor power, processes the sensor output and displays the real time position measurement of the stage slider on a dedicated display. An alternate embodiment of the disclosed device exploits a battery-powered sensor and a wireless connection between the sensor/stage and a remote processor and display.

DETAILED DESCRIPTION

Figure 1:
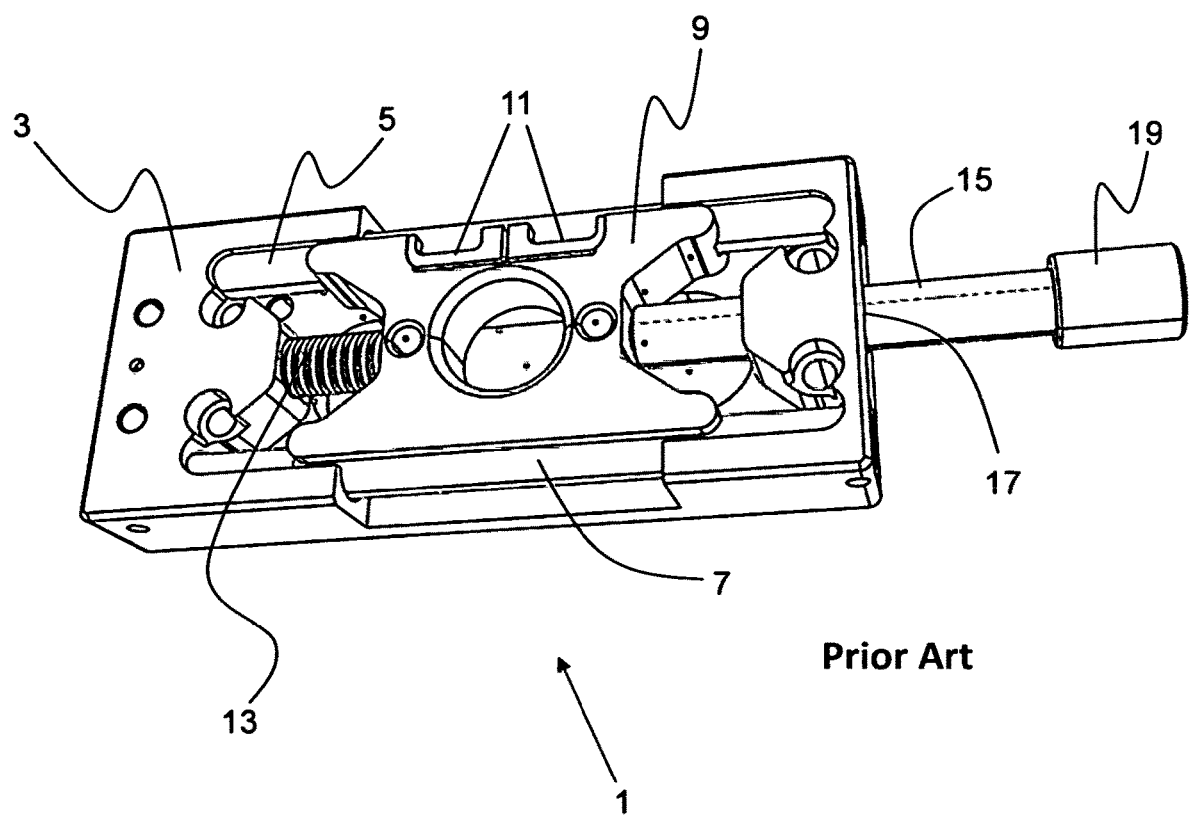
FIG. 1 is a pictorial diagram of a prior art manual micro positioning stage.

Shown in FIG. 1 is a prior art manual micro positioning stage 1 less than a few inches in longitudinal dimension. The stage 1 comprises a stage body 3, precision rails 5, 7, a slider 9 with flexures 11 to preload the slider 9 against the reference rail 7, a return spring 13 captivated between the slider 9 and stage body 3, a lead screw 15 that may be manually advanced through a thread 17 in the stage body 3 to make contact with the slider 9 by rotation of the thumb knob 19. Such a stage is capable of submicron motion. The ability to provide accurate digital display of the position of the stage slider is a valuable feature provided in the present disclosure.

Figure 2:
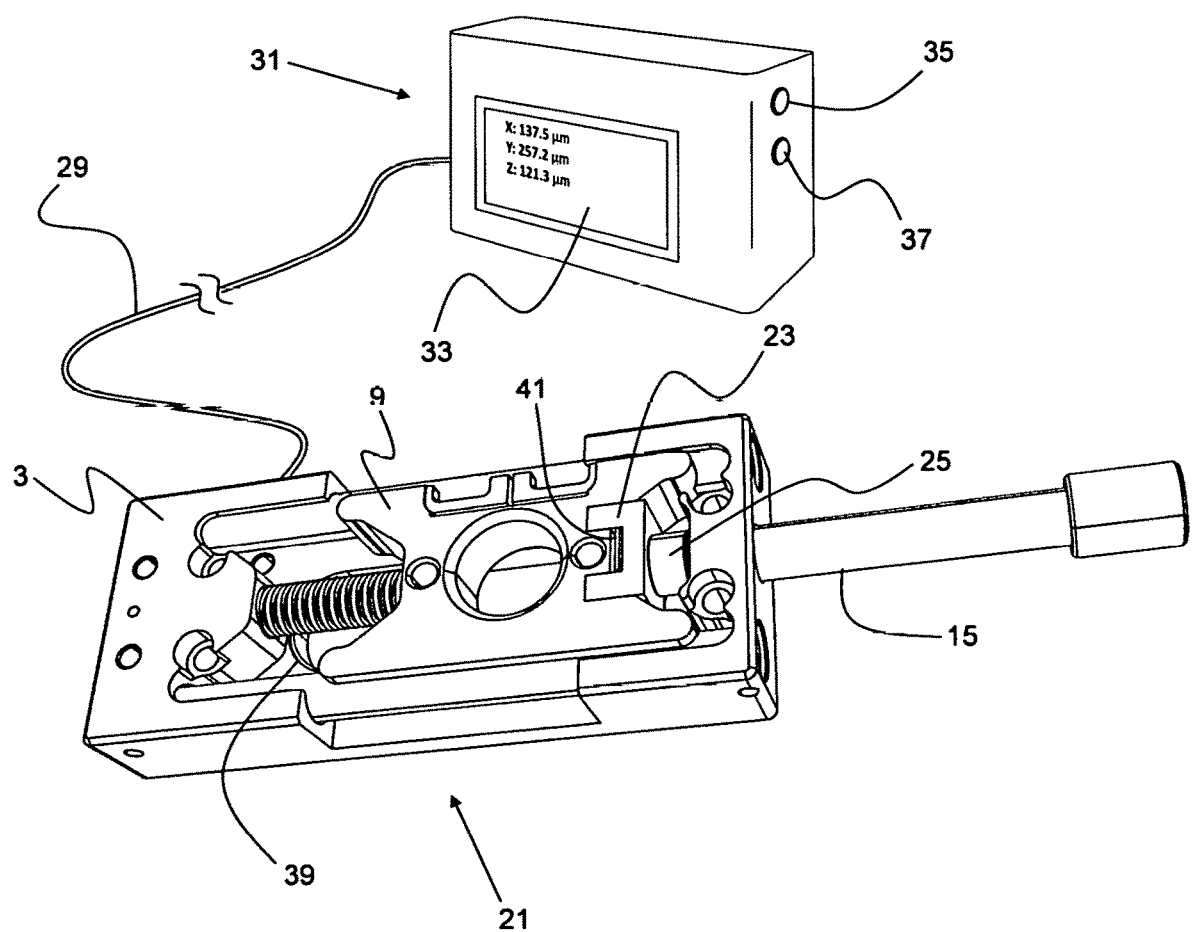
FIG. 2 is a pictorial diagram of a micro positioning stage incorporating means to electronically display slider position.
Figure 3:
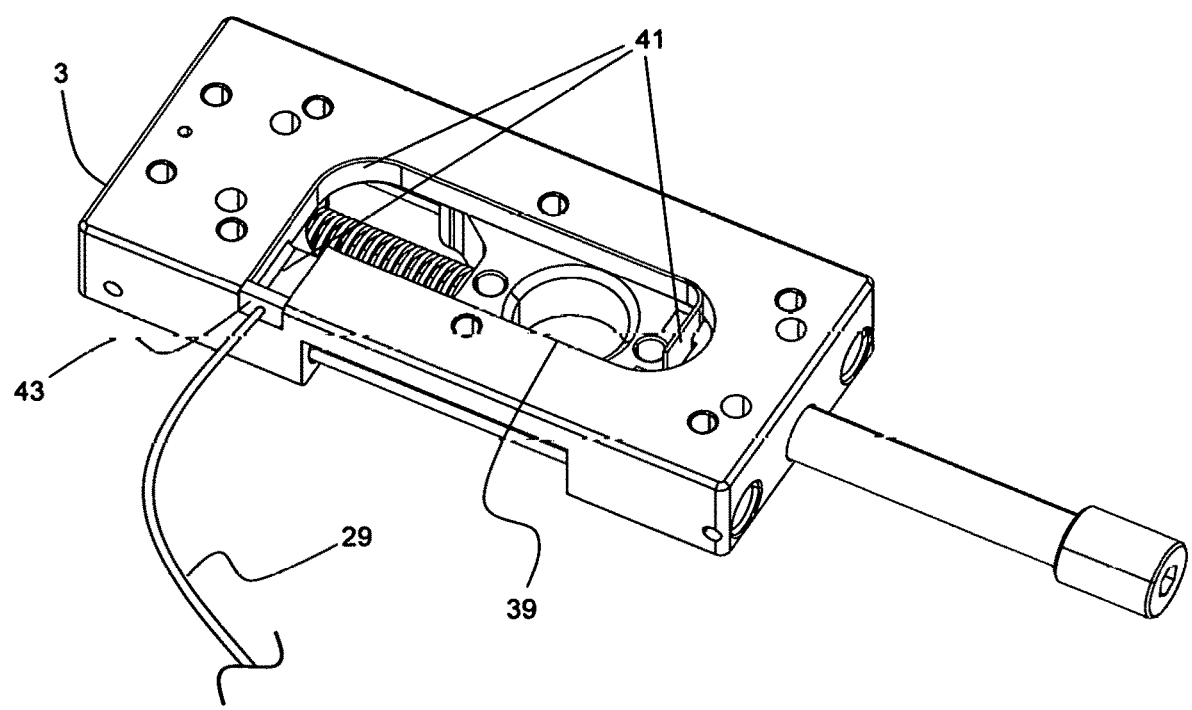
FIG. 3 is a bottom pictorial diagram of the stage of FIG. 2 depicting location of the sensor flexible circuit and its attachment to a wire connection to a display.

The device of FIG. 2 portrays a manually-actuated micro positioning stage 21 that incorporates a mechanism for measurement and electronic output of the slider position. A magnetic Hall Effect sensor device is used to sense rotary position of the lead screw. Based on the lead screw pitch, processor means converts the sensor output into measurement and display of the lead screw and hence slider displacement. A cap 25 contains a small disc magnet that is poled diametrically and is affixed to the end of the lead screw in contact with the slider 9 by means of a sensor housing 23. A Hall Effect sensor (not shown in this figure) contained in a surface mount electronic package is enclosed in the sensor housing 23 and is positioned coaxially with the lead screw 15 in proximity to the magnet-containing cap 25. Both the cap 25 and sensor housing 23 are constructed of relatively hard materials to provide a functional contact interface that supports smooth rotary motion of the lead screw 15. Additionally, the cap 25 and sensor housing 23 material compositions must be relatively non-magnetic and magnetically permeable so as to not hinder or distort the magnetic field of the magnet; brass is one alloy that would be acceptable, for example. The use of field tailoring techniques such as the employment of high magnetic permeability materials is within the scope of this invention. The sensor is mounted on a flexible circuit 41 that is routed underneath the slider 9 along the perimeter of the through way 39 in the stage body 3 (as depicted in FIG. 3). As the lead screw 15 is rotated, the magnetic field associated with magnetic sweeps across the Hall Effect sensor device. An electronic output indicative of the magnitude of angular motion is conveyed from the sensor by way of the flexible circuit 41 to a wired connection 29 to remote display device 31. Contained in the display device is a processor that performs signal conditioning and converts the sensed angle data to linear displacement (based on lead screw pitch) for display on a contained electronic display device 33, which may be LED, LCD, or other display technologies well known in the prior art. Buttons 35 and 37 permit the user to re-zero the position of the sensor or convert the display units from metric to English, respectively. The display device may be battery-powered or utilize a wall plug adapter, has provision for concurrent display of position data from multiple stages (as may be desired for x-y-z configurations of stages), and stores last position for recall in case power is lost.

In FIG. 3, it can be appreciated that the flexible circuit 41 is seated along the perimeter of the through way 39 in the stage body 3 underneath the slider 9. The flexible circuit 41 can be adhesively bound to the perimeter of the through way 39 for a portion of its length in order to stress relieve it, to insure compliance with the geometry as the stage body 3 and to permit a portion of the flexible circuit to flex with motion of the slider 9. The terminal end of the flexible circuit 41 is electrically in contact with an external wired connection 29 to the display device and is affixed and stress relieved at this interface by a potted volume 43 or other appropriate means.

Figure 4:
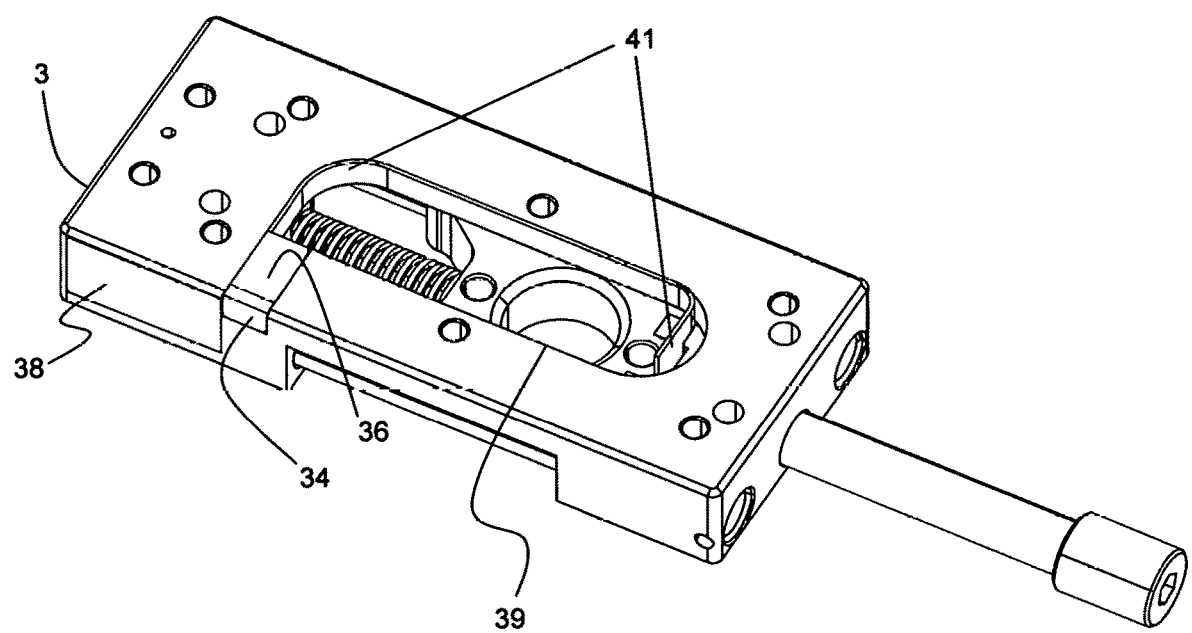
FIG. 4 is a bottom pictorial diagram of the stage of FIG. 2 depicting location of the sensor flexible circuit and its attachment to a wireless connection to a display.

An alternative to a wired connection 29 to electronic display device 33 is shown in the Bluetooth (or other wireless technology) connection of FIG. 4. The flexible circuit 41 connects with a compact rechargeable battery 36 such as one or more lithium polymer cells and to a Bluetooth transceiver chip enclosed in volume 34. The Bluetooth transceiver is connected to an antenna applique 38 which isolates the antenna electrically from the stage body 3 and thereby mitigates antenna pattern disturbance. The applique can be conformal with the stage body. Various antenna alternatives, as well known in the prior art, may be employed, for example, trailing wire, or a low profile, surface mount type, ceramic loop antennas (from such sources as Taoglas in Ireland), etc. Not shown in the figures is the corresponding Bluetooth transceiver present in the display device 33 with the attending antenna connection for this embodiment.

Figure 5:
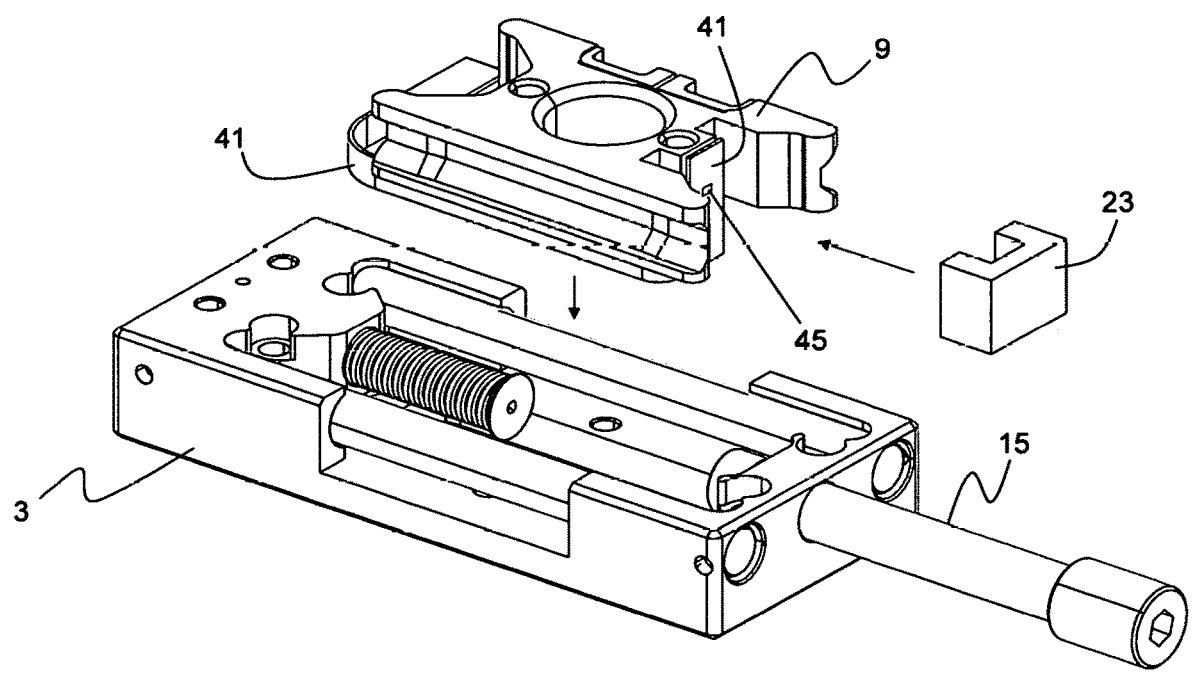
FIG. 5 is a first exploded diagram of the stage of FIG. 2 depicting geometry of the sensor and sensor housing.
Figure 6:
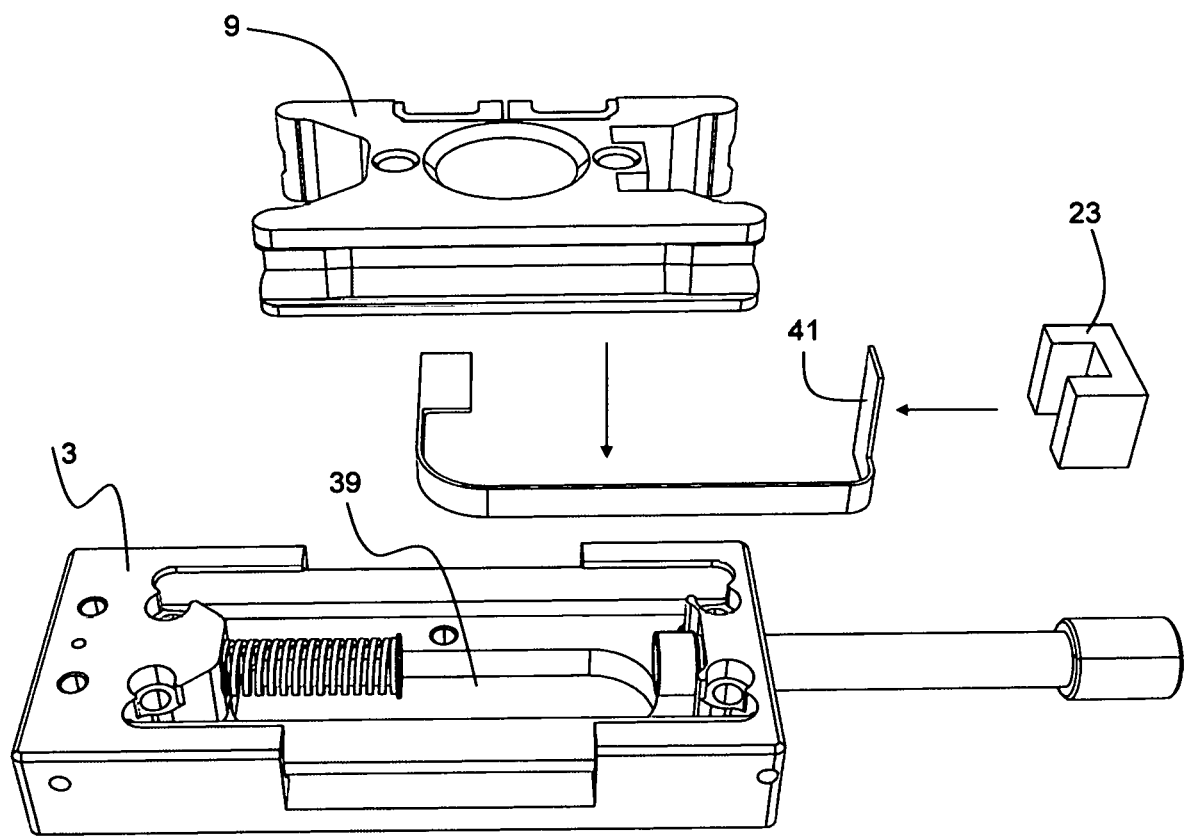
FIG. 6 is a second exploded diagram of the stage of FIG. 2 that highlights the contour of the flexible circuit and sensor location relative to other parts of the stage.
Figure 7:
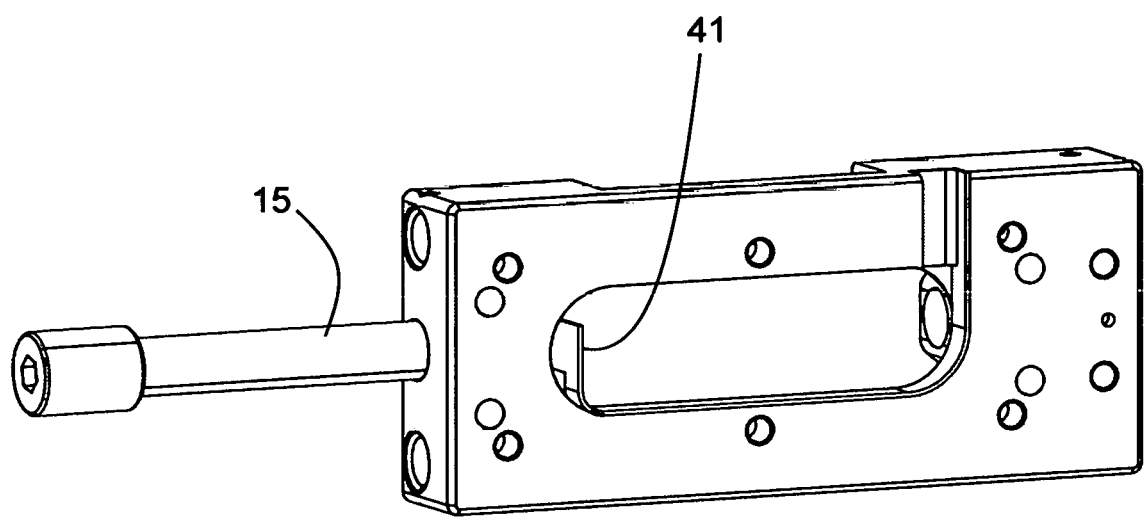
FIG. 7 is a pictorial diagram of the flexible circuit placement in the stage body.
Figure 8:
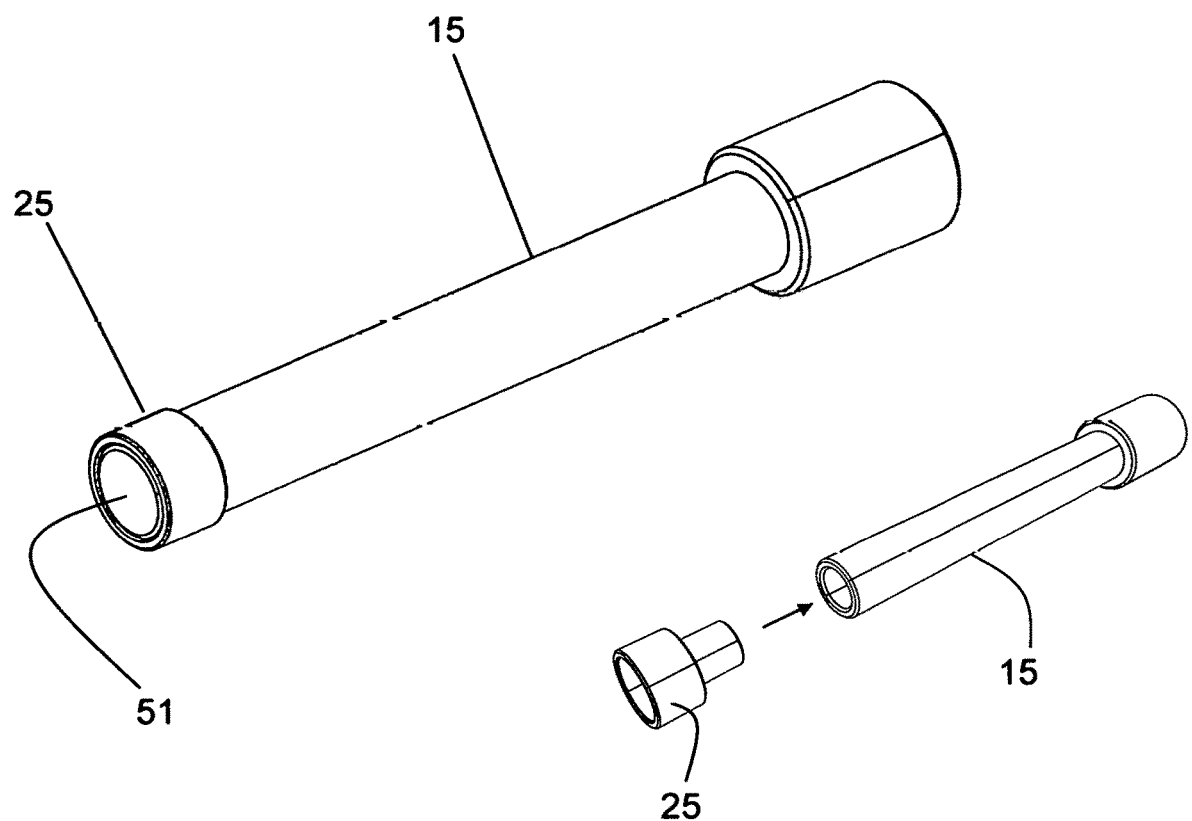
FIG. 8 is a pictorial diagram of the lead screw with magnet and magnet cup.
Figure 9:
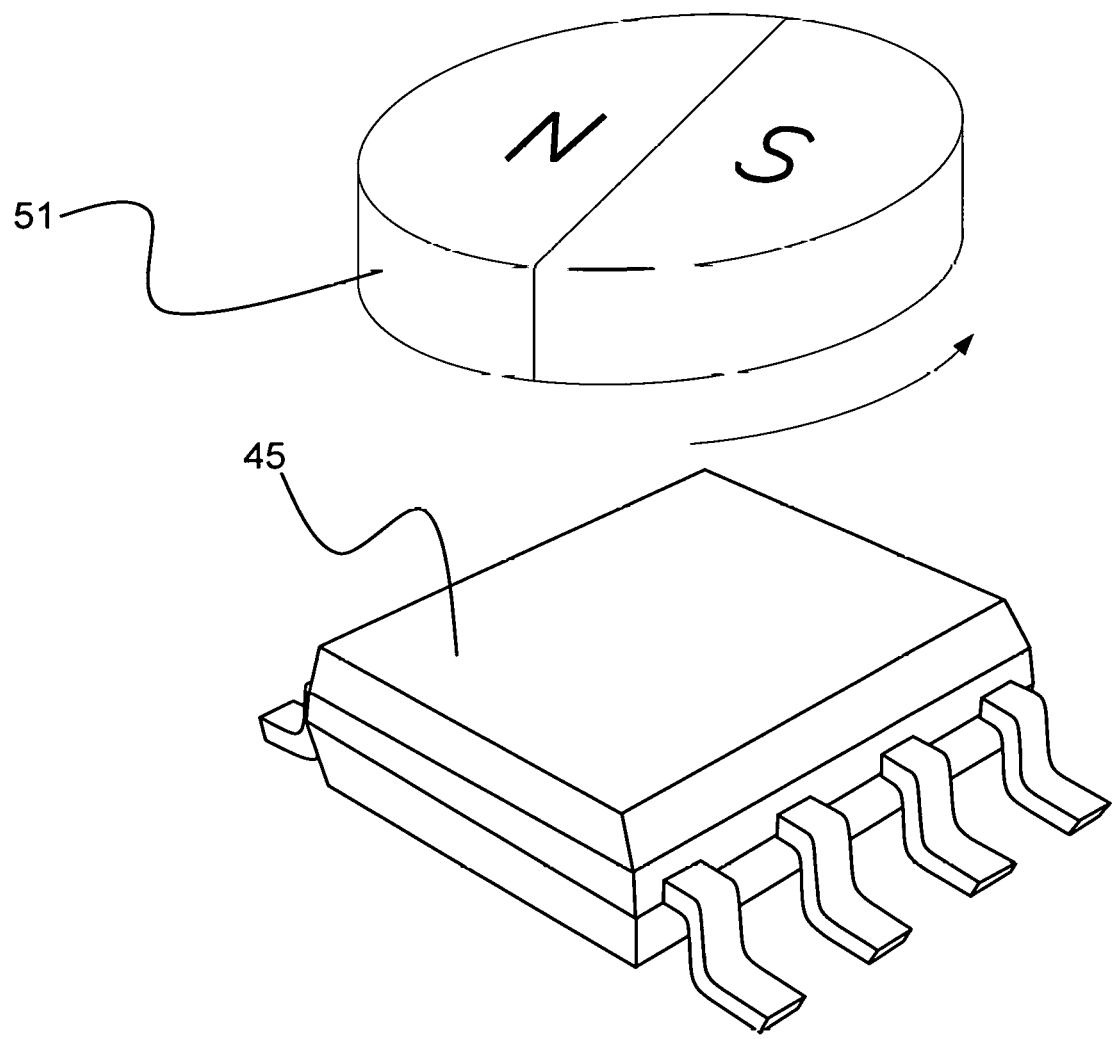
FIG. 9 is a pictorial diagram of the magnet and sensor geometry.

In the exploded diagram of FIG. 5, it is visible that the sensor 45 is seated on one end of the flexible circuit 41 that is conformal with the end of the slider 9 and it is coaxial with the lead screw 15. The shape of the flexible circuit 41 shown in FIG. 6 is conformal with the through way 39 in the bottom of the stage. In FIG. 7, the slider 9 and associated parts are absent to facilitate a view the disposition of the flexible circuit from the bottom of the stage. The magnet 51 is captivated in the cup 25 which is inserted into the lead screw 15 as shown in FIG. 8. Alternative means of affixing the cup 25 are envisioned including a double-ended cap which permits insertion of the magnet 51 on one end and insertion of the lead screw 15 on the other end. The magnet 51 is diametrically poled as depicted in FIG. 9 so that highest flux density occurs on the edge of the magnet disc. Hence as the magnet 51 is rotated, the circumferential inhomogeneity of the field is sensed by the surface mount Hall Effect sensor 45. The small magnet disc is of neodymium composition and a good candidate for sensor 45 is the AS5600L part manufactured by Austria Micro Systems. It provides 12 bits of resolution over 360 degrees of rotation (0.0015 degrees of angular resolution). So when used in concert with a lead screw pitch of 80 turns per inch, a theoretical longitudinal motion resolution of 0.077 microns results. Of course, error sources such as screw inaccuracies and other contributing factors will detract from this ideal case, however, submicron resolution and repeatable positioning are achievable.

The invention claimed is:

1. A manually-actuated linear stage with digital display comprising:
   a. a stage body serving to provide the support structure for the stage,
   b. slider rails upon which the slider travels under lateral preload,
   c. a slider,
   d. a manually-adjustable lead screw of determined pitch, exhibiting an axis of rotation, threaded into the stage body and in contact with the slider,
   e. a return spring serving to preload the slider against the lead screw along the rotational axis of the lead screw,
   f. a magnet exhibiting a circumferentially inhomogeneous magnetic field affixed to the lead screw in proximity to the lead screw contact with the slider,
   g. a magnetic sensor affixed to the slider in proximity to the lead screw contact with the slider,
   h. processor and display means,
   i. communication means providing signal communication between the magnetic sensor and the processor and display means,
   wherein rotation of the lead screw advances the slider and causes concurrent rotation of the magnet affixed to the lead screw and the magnet's circumferentially inhomogeneous magnetic field, the change in magnetic field strength sensed by the magnetic sensor located on the slider is a measure of the instantaneous angle of rotation of the lead screw and is communicated via communication means to the processor and display means, based on the measured angular motion and pitch of the lead screw, the processor calculates a value for the resulting longitudinal position of the slider and provides this information to the display means.

2. A manually-actuated linear stage with digital display as recited in claim 1 wherein the communication means comprises a wired electrical connection.

3. A manually-actuated linear stage with digital display as recited in claim 1 wherein the communication means comprises a wireless connection.

4. A manually-actuated linear stage with digital display as recited in claim 1 wherein the processor means permits switching the display between metric and English units.

5. A manually-actuated linear stage with digital display as recited in claim 1 wherein the processor means calculates permits setting the current, measured slider position to zero.

6. A manually-actuated linear stage with digital display as recited in claim 1 wherein the processor means stores slider position for recall in the event of power loss.

\* \* \* \* \*